(12) United States Patent  
Johnson et al.

(10) Patent No.: US 6,427,795 B1  
(45) Date of Patent: Aug. 6, 2002

(54) UNDERGROUND ROLL OVER PROTECTION STRUCTURE

(75) Inventors: Allan R. Johnson, Stowport; Robert B. Charter, Perth, both of (AU)

(73) Assignee: Caterpillar Elphinstone Pty. Ltd. (AU)

( * ) Notice: Subject to any disclaimer, the term of this patent is extended or adjusted under 35 U.S.C. 154(b) by 0 days.

(21) Appl. No.: 09/429,713

(22) Filed: Oct. 29, 1999

(51) Int. Cl.⁷ .............................................. B62D 33/067
(52) U.S. Cl. ..................... 180/89.14; 296/190; 296/197
(58) Field of Search ........................... 180/89.12, 89.13, 180/89.14, 274; 296/190.01, 190.03, 190.05, 190.07; 267/36.1; 293/132, 135

(56) References Cited

U.S. PATENT DOCUMENTS

| | | | | |
|---|---|---|---|---|
| 4,061,392 A | * | 12/1977 | Lowder et al. | 296/28 |
| 4,515,234 A | | 5/1985 | Loy et al. | |
| 4,531,776 A | | 7/1985 | Laws et al. | |
| 4,763,885 A | * | 8/1988 | Zamitter | 267/227 |
| 4,889,385 A | * | 12/1989 | Chadwick et al. | 297/302 |
| 5,064,242 A | | 11/1991 | Fujan et al. | |
| 5,150,942 A | * | 9/1992 | Fujan et al. | 296/190 |
| 5,799,746 A | | 9/1998 | Kortelainen et al. | |
| 6,102,471 A | * | 8/2000 | Sasser et al. | 296/190.5 |
| 6,109,398 A | * | 8/2000 | Lempio et al. | 188/82.4 |

FOREIGN PATENT DOCUMENTS

DE     1 557 284     12/1979

* cited by examiner

*Primary Examiner*—Kenneth R. Rice  
*Assistant Examiner*—Christopher Buchanan  
(74) *Attorney, Agent, or Firm*—Steven G. Kibby

(57) ABSTRACT

A roll over protection structure for a work machine includes an operator cab and a rotation mount connecting one face of the cab to the work machine. The rotation mount provides for rotation of the cab about an axis parallel to the work machine longitudinal axis. A deforming member connects a second face of the operator cab with the work machine and is characterized by elastic deformation responsive to normal operational shocks acting on said cab, and by controlled plastic deformation responsive to larger forces indicative of a machine roll over.

10 Claims, 3 Drawing Sheets

UNDERGROUND ROLL OVER PROTECTION STRUCTURE

TECHNICAL FIELD

The present invention relates to an operator cab arrangement for a mobile machine, and more particularly to a roll over protection structure for an underground mining machine.

BACKGROUND ART

Operator cabs for underground mobile mining machines have in recent times been strengthened to withstand the rigors of underground mining. For example, the roof and associated support members may be constructed to withstand occasional contact with the mine walls, as well as rock falls onto the roof of the cab, referred to as Falling Object Protection Structures (FOPS).

Machine owners or authorities have not generally seen the need to provide for roll over protection because of the confined spaces in which the machines work. Increasingly however, customers and statutory authorities have begun demanding Roll Over Protection Structures (ROPS) in the underground mining, exploration and tunneling industries, at least partly in recognition of the portion of the time during which the machines are operated above ground.

International ROPS Standards, such as ISO3471, SAEJ1040, AS2294.2, require that the cab withstand given lateral, vertical and longitudinal forces, as well as absorb a certain lateral energy. In a machine roll over, the energy absorbing criteria assists in slowing down the lateral rotation of the machine. Such absorption is also useful in reducing the forces transmitted to the mounts attaching the cab to the machine chassis, since an inflexible construction requires stronger mounts to prevent the cab from breaking loose from the chassis.

While underground machine cabs have been able to meet withstand the required forces via a relatively inflexible construction of the cab and chassis, the energy absorption goal has proven more difficult, due to the confined nature of the operating environment. A conventional ROPS for construction machinery, generally a rectangular tubular frame, may absorb lateral energy by bending at the corners, in the manner of a parallelogram. In order to minimize overall machine profile for operation in tunnels however, the cab of an underground machine generally has less space around the operator, and is mounted low to the ground alongside the bulk of the machine chassis. The cab consequently can not be constructed to bend as described above without intruding into a defined operator space or coming up against the machine chassis.

Kortelainen et al., in U.S. Pat. No. 5,799,746, issued Sep. 1, 1999, disclose an underground vehicle safety cab which with its frame and fastenings must independently withstand a given vertical loading. Lateral and longitudinal forces on the cab however, are transmitted to outside safety bars made of plates in the form of box girders, connected to the cab through reaction bars having flexible fixing elements. The flexible elements are simply rubber dampers which yield to their limit, after which the L-shaped safety bars can absorb a given lateral energy by bending at both a horizontal and vertical part.

The aforementioned construction is relatively complex and may have bending characteristics which are difficult to control or predict. What is needed is a simple mounting arrangement which provides the desired safety characteristics though controlled plastic deformation.

DISCLOSURE OF THE INVENTION

A roll over protection structure for a work machine includes an operator cab and a rotation mount connecting one face of the cab to the work machine. The rotation mount provides for pivotal rotation of the cab about an axis parallel to the work machine longitudinal axis. A deforming member connects a second face of the operator cab with the work machine and is characterized by elastic deformation responsive to normal operational shocks acting on said cab, and by controlled plastic deformation responsive to larger forces indicative of a machine roll over.

BRIEF DESCRIPTIONS OF THE DRAWINGS

A more complete appreciation of this invention will be understood by reference to the following detailed description when considered in conjunction with the accompanying drawings in which like reference symbols indicate the same or similar components, wherein.

BEST MODE FOR CARRYING OUT THE INVENTION

Figure 1:
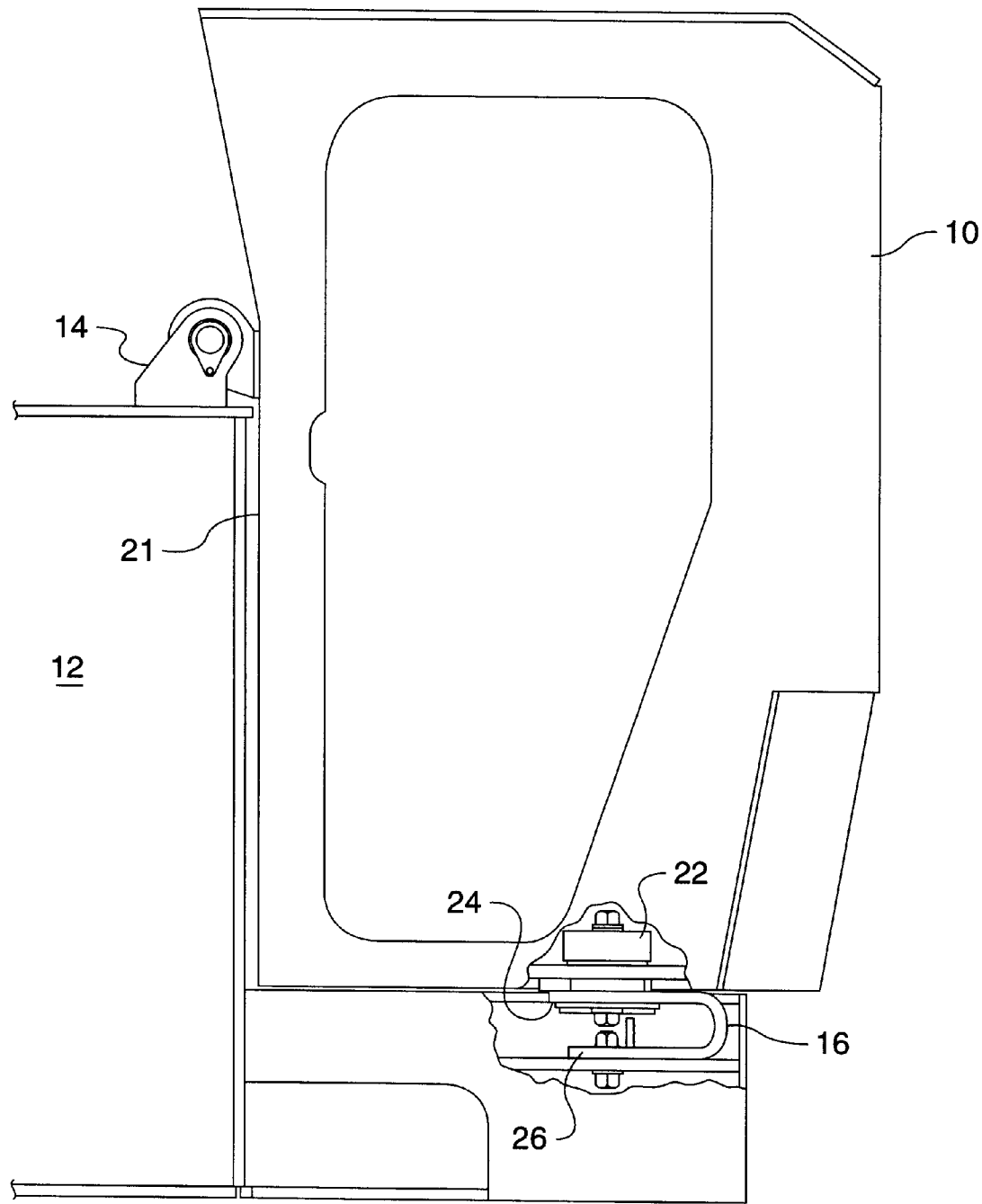
FIG. 1 shows a front plan view of an embodiment of the invention, including a cutaway view illustrating attachment of a machine cab to a machine chassis.

A roll-over protection structure according to the present invention includes a strong operator cab 10 secured to the machine chassis 12 by one or more rotational mounts 14, 15 and deforming member 16. With particular reference to the view shown in FIG. 1, rotational mounts 14,15 transmit longitudinal (into the page) forces on the cab to the chassis 12, but permits the cab to rotate about an axis 18 of the rotational mount 14 in response to lateral (left-right) forces as well as vertical forces. Preferably rotational mounts 14,15 (FIG. 2) pivotally attach a substantially vertical wall of the cab to the chassis 12 near both the front and rear of the cab 10, and are oriented to restrict rotation of the cab to an axis 18 substantially parallel to the center line of the machine in the direction of travel.

The structure allows for the construction of a generally inflexible cab and chassis having the required strength characteristics, while providing lateral energy absorption via at least one deforming member 16. The deforming member 16 provides a second attachment between the cab and the chassis at a point spaced apart from the rotation axis of the rotation mount 14. Deforming member 16 is preferably a U-shaped steel member attached between the chassis 12 and bottom face or floor 20 of cab 10 along opposing respective legs 24,26 of the member 16. The legs of said U-shaped member are aligned orthogonal to the center line (longitudinal axis) of the machine, so that lateral forces on the cab separate the legs 24,26 from one another, and provide controlled deformation at the bend in the member 16.

Plastic deformation characteristics of a single plate of high strength, low alloy, structural steel is relatively predictable, permitting controlled deformation by appropriate sizing of the member 16. Member 16 may be bolted or otherwise fixedly attached directly to the chassis 12 and floor 20 of cab 10, or may be separated therefrom by an elastomeric material such as damping elements 22, 23 to further provide damping of vibrations and minor shocks to the cab.

Industrial Applicability

Figure 2:
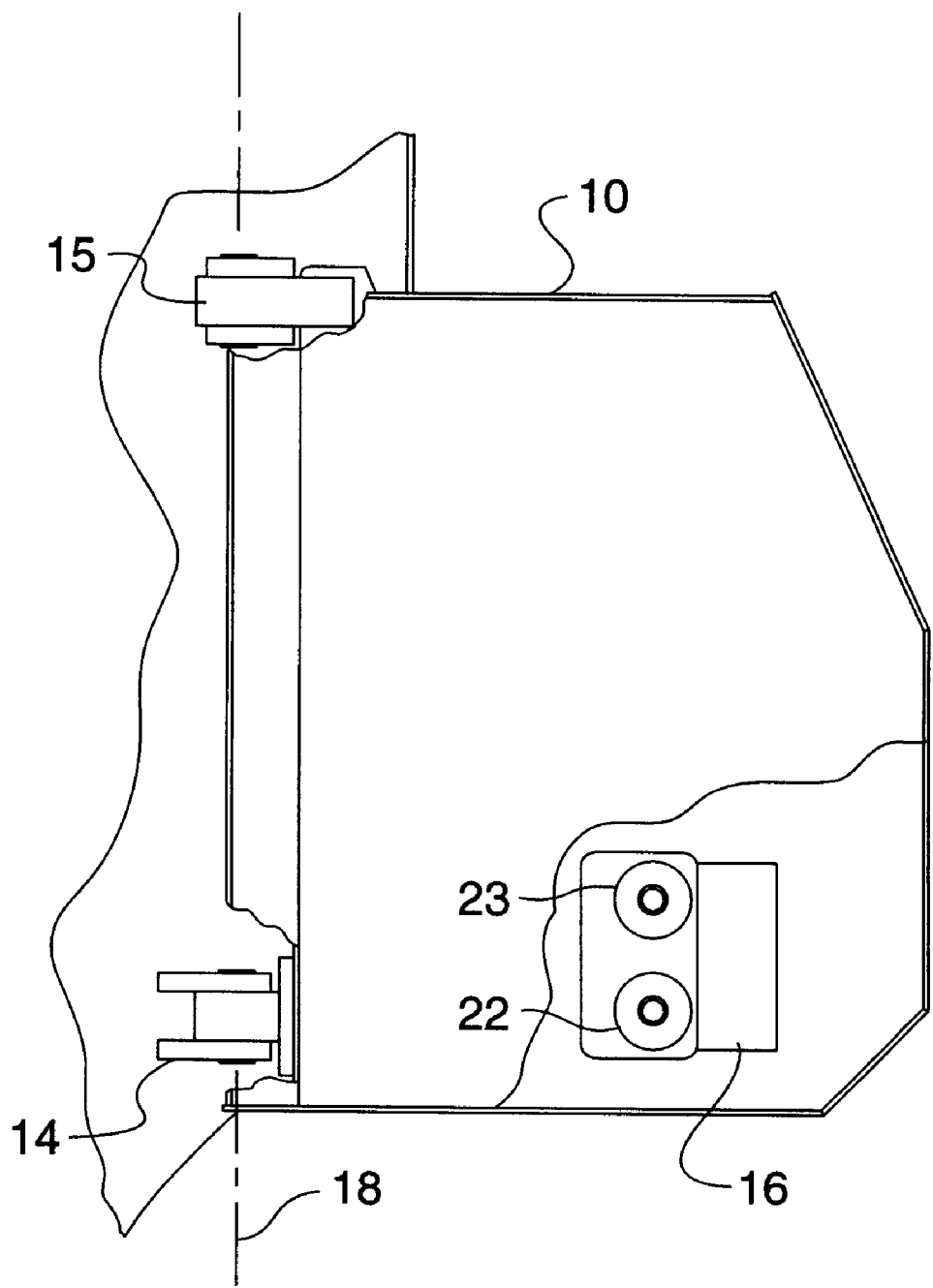
FIG. 2 shows a top plan view of the relationship between a ROPS arrangement and the chassis shown in FIG. 1, including a cutaway to show the deforming member.
Figure 3:
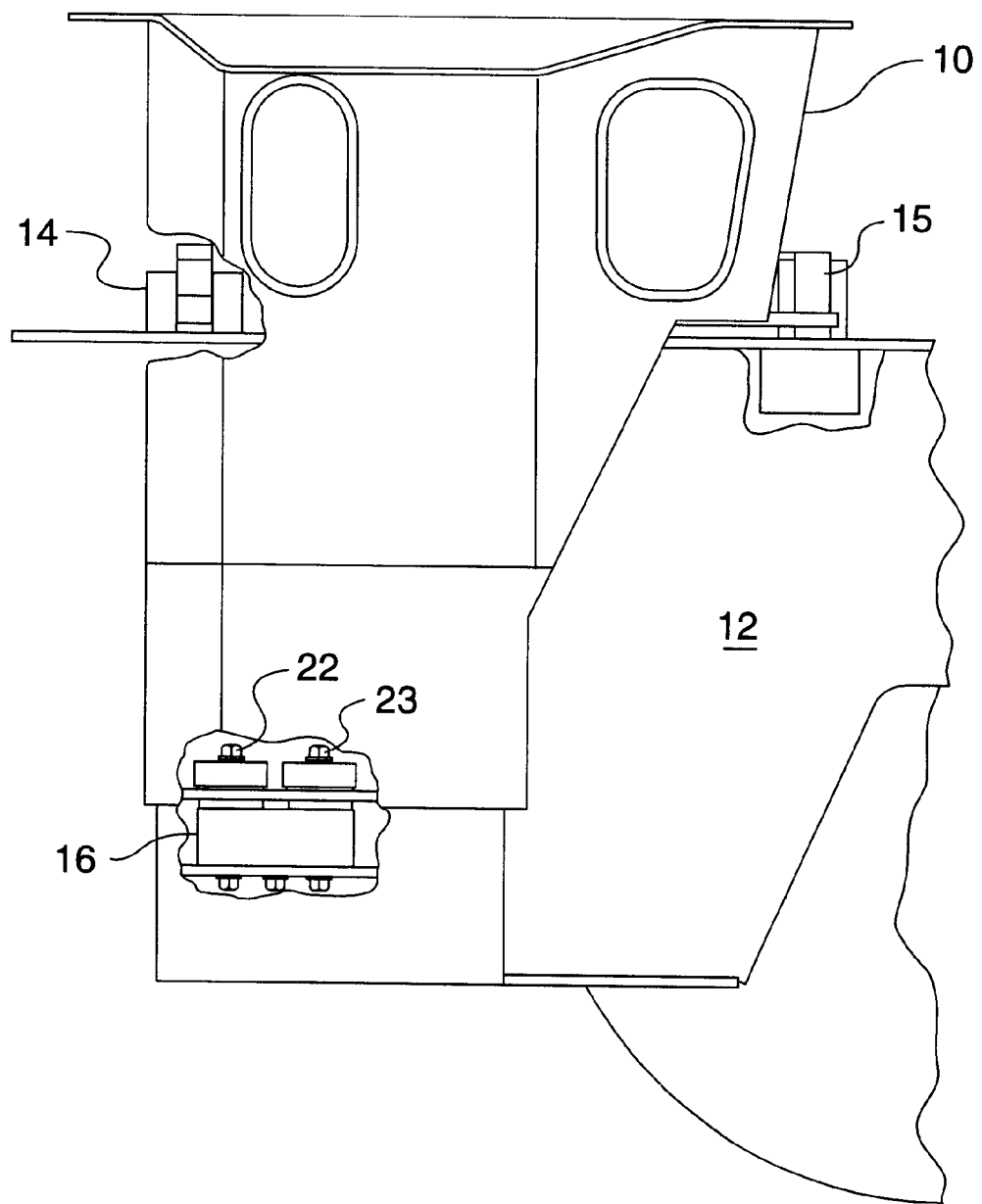
FIG. 3 shows a side plan view of the ROPS arrangement illustrated in FIG. 1, including a cutaway view of the deforming member.

The operation of the present invention is best described in relation to FIG. 1. When a lateral force is applied to the cab, deforming member 16 begins to yield and allow the cab 10 to rotate about the axis 18. In response to relatively lesser lateral forces, such as are generated by contact between the cab and the tunnel wall, deforming member 16 yields elastically and returns to its original configuration when the force is removed.

At a point where the lateral force increases to a level substantially approximating a machine rollover, deforming member 16 undergoes controlled plastic deformation to absorb the lateral energy without significant deformation of the cab 10 and chassis 12. Controlled plastic deformation of the deforming member 16 is a significant aspect of lateral energy absorption according to the present invention, because a springy steel mount might re-release energy and actually contribute to the severity of a rollover event.

The amount of energy absorption required is defined in the various ROPS standards and is calculated on the basis of the machine mass. The deforming members 16, being very simple in construction compared to the cab assembly 10 and chassis 12 are readily designed to provide the optimum energy absorption performance. The simple design is further enhanced by removing major structural welds from the plastically deforming area of the deforming member 16.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

What is claimed is:

1. A roll over protection structure for a work machine, the work machine having a centerline in the direction of travel, the structure comprising:

an operator cab having a plurality of faces;

at least one rotational mount connecting a first face of said operator cab to the work machine, said rotational mount providing for rotation of said cab about an axis parallel to the center line of the work machine; and at least one deforming member connecting a second face of said operator cab with the work machine, said deforming member including a U-shaped member having a first leg connected with a chassis of the machine and a second leg connected with said operator cab, said U-shaped member characterized by elastic deformation responsive to normal operational shocks acting on said cab, and by controlled plastic deformation responsive to larger forces indicative of a machine roll over.

2. The structure of claim 1, wherein the legs of said U-shaped member are aligned orthogonal to a centerline of the machine.

3. The structure of claim 2, wherein the deforming member further includes elastomeric material separating the U-shaped member from at least one of the machine and said operator cab.

4. The structure of claim 2, wherein said U-shaped member is composed of steel.

5. The structure of claim 1, wherein said rotation mount and said deforming member are connected with adjacent faces of said operator cab.

6. The structure of claim 5, wherein said rotation mount is connected with a vertical wall of the operator cab, and the deforming member is connected with a floor of said operator cab.

7. A roll over protection structure for a work machine, comprising:

an inflexible operator cab;

at least one rotational mount for providing pivotal connection between a substantially vertical wall of said operator cab and a chassis of the work machine about an axis parallel to a longitudinal axis of the work machine; and a U-shaped deforming member connecting a floor of the operator cab with the work machine, for absorbing lateral forces on said operator cab orthogonal to said longitudinal axis by elastic deformation responsive to normal operational shocks acting on said cab, and by controlled plastic deformation responsive to larger forces indicative of a machine roll over.

8. The structure of claim 7, wherein the U-shaped deforming member is connected along a first leg with the machine chassis and along a second leg is connected with a floor of said operator cab.

9. The structure of claim 8, wherein said U-shaped deforming member is composed of steel and further including an elastomeric material interposed a leg of said deforming member and said operator cab floor.

10. A roll over protection structure for a work machine, comprising:

an operator cab having a plurality of faces;

at least one rotational mount connecting a first face of said operator cab to the work machine, said rotational mount providing for pivotal rotation of said cab about an axis of said mount; and at least one U-shaped deforming member connecting a second face of said operator cab with the work machine, said deforming member characterized by elastic deformation responsive to normal operational shocks acting on said cab, and by controlled plastic deformation responsive to larger forces indicative of a machine roll over.

* * * * *